United States Patent [19]

Lapp

[11] 4,013,266
[45] Mar. 22, 1977

[54] CABLE TENSIONING DEVICE WITH IMPROVED LOADING AND REMOVAL CAPABILITY

[76] Inventor: Ellsworth W. Lapp, c/o Lapp Engineering, 6060 S. 11th St., Rockford, Ill. 61109

[22] Filed: Mar. 4, 1976

[21] Appl. No.: 663,969

[52] U.S. Cl. ............................................. 254/69
[51] Int. Cl.² ......................................... B66F 1/00
[58] Field of Search ........................... 254/51–56, 254/66–82, 29 R, 29 A

[56] References Cited

UNITED STATES PATENTS

| | | | |
|---|---|---|---|
| 2,864,582 | 12/1958 | Hall | 254/51 |
| 3,616,651 | 11/1971 | Chang et al. | 254/105 |
| 3,701,509 | 10/1972 | Stinton | 254/29 A |

*Primary Examiner*—Al Lawrence Smith
*Assistant Examiner*—Robert C. Watson
*Attorney, Agent, or Firm*—Leydig, Voit, Osann, Mayer & Holt, Ltd.

[57] ABSTRACT

Two spaced heads carry gripping and pulling elements which clamp and tension the two lapped end sections of a cable when the heads are spread apart by linear actuators. The heads are formed with downwardly opening cable-receiving throats which enable the cable to be loaded into the tensioning device simply by placing the device over the cable.

2 Claims, 10 Drawing Figures

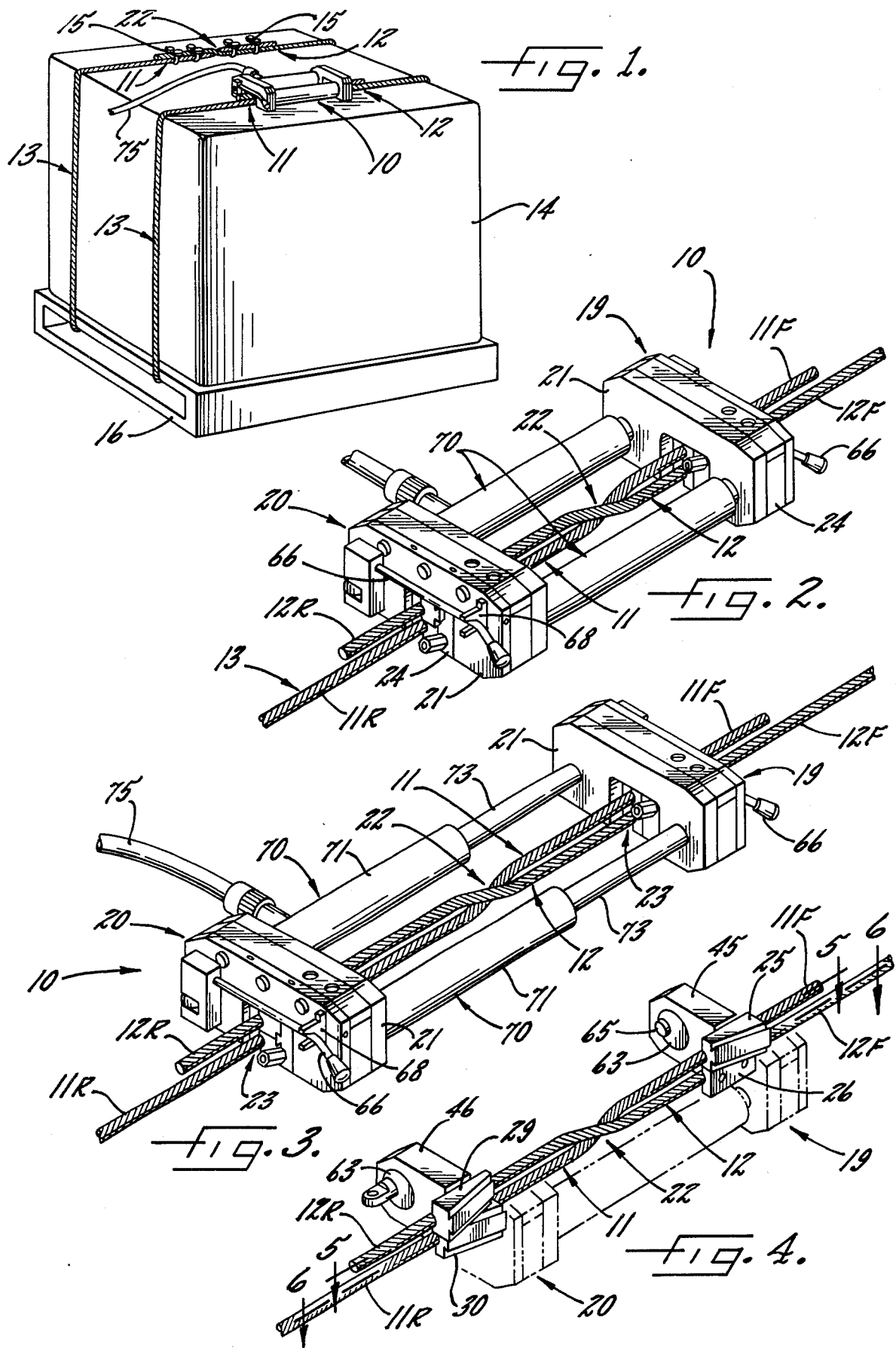

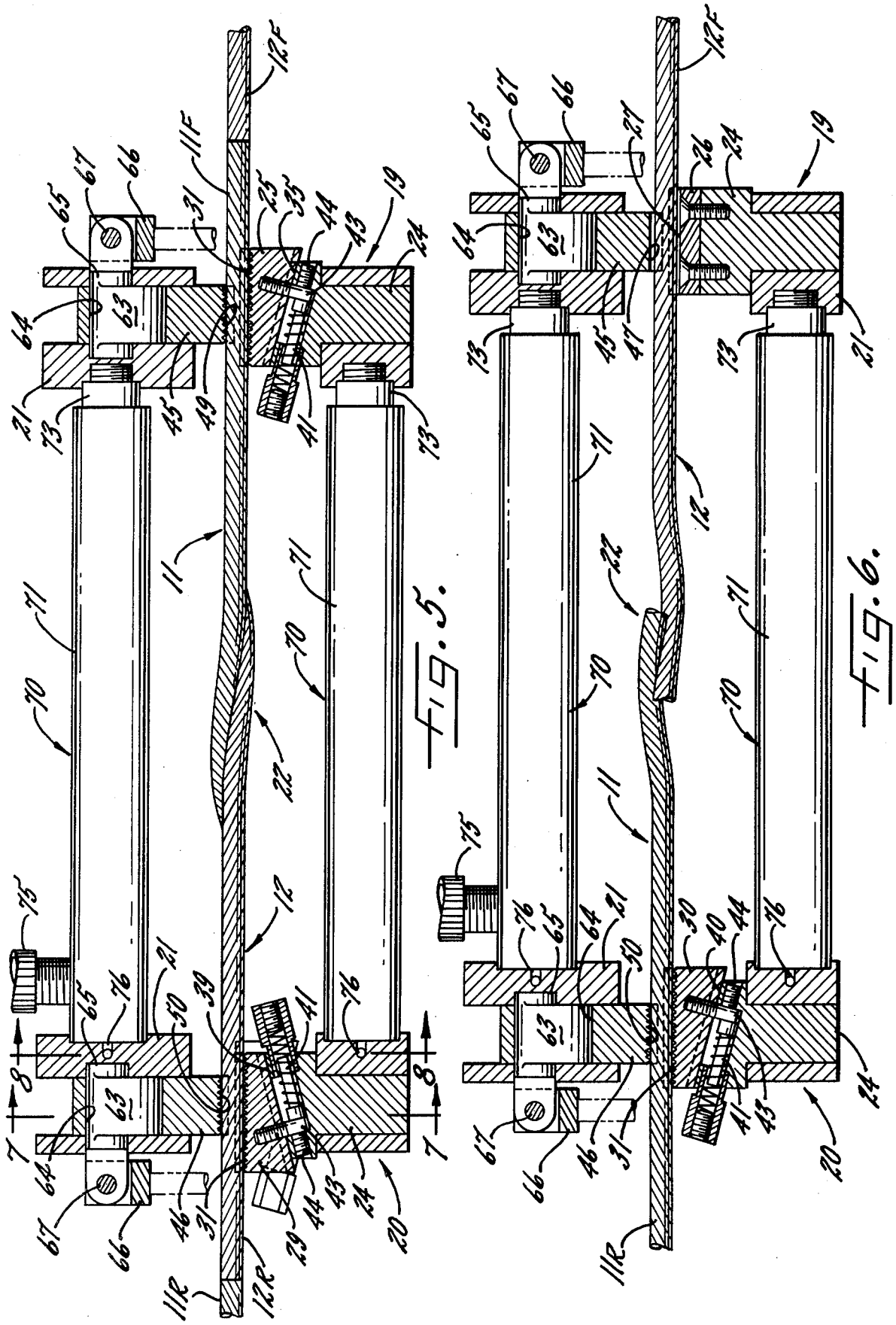

CABLE TENSIONING DEVICE WITH IMPROVED LOADING AND REMOVAL CAPABILITY

CROSS-REFERENCE TO A RELATED APPLICATION

This invention constitutes an improvement over the invention discussed in my application Ser. No. 660,368, filed Feb. 23, 1976, and entitled Cable Tensioning Device.

BACKGROUND OF THE INVENTION

The above-identified application discloses a device for drawing a cable or the like tightly around an article and for placing the cable under tension prior to the overlapped end sections of the cable being fastened together to maintain the tension. More specifically, the device includes two heads each having a throat into which the end sections of the cable are placed. One end section of the cable is adapted to be clamped by a gripping element carried by one of the heads while the other end section of the cable is adapted to be clamped by a gripping element carried by the other head. When the two heads are spread apart by linear actuators, the gripping elements pull the cable end sections in opposite directions and place the cable in tension. The device is preferably but not necessarily capable of being actuated through successive hitch strokes if more than one stroke is needed to impart the necessary tension to the cable.

SUMMARY OF THE INVENTION

The general aim of the present invention is to provide a new and improved cable tensioning device of the above general type which better lends itself to use in confined locations and which, more importantly, permits the cable to be placed in closer proximity to the article being secured by the cable so as to enable the cable to be tightened into better conforming engagement with the article.

A more detailed object is to achieve the foregoing by providing a cable tensioning device whose heads have open throats which may be loaded simply by placing the device over the cable end sections so as to avoid the need of inserting the device between the cable and the article for loading purposes. The open throat also facilitate removal of the tensioning device from the cable after the latter has been tensioned.

The invention also resides in the novel positioning of the gripping elements on the heads so as to enable the cable to be twisted prior to being tightened, such twisting of the cable serving to prevent the cable tension from turning the device end-for-end and throwing the device off the cable.

These and other objects and advantages of the invention will become more apparent from the following detailed description when taken in conjunction with the accompanying drawings.

BRIEF DESCRIPTION OF THE DRAWINGS

FIG. 1 is a perspective view showing a cable being tightened around an article by a new and improved cable tensioning device embodyiing the unique features of the present invention.

FIG. 2 is a perspective view of the device and shows the end sections of the cable loaded into the device.

FIG. 3 also is a perspective view of the device but shows the cable being tensioned by the device.

FIG. 4 is a fragmentary perspective view which primarily shows the gripping and pulling elements.

FIGS. 5 and 6 are enlarged cross-sections taken substantially along the line 5—5 and 6—6, respectively, of FIG. 4.

DETAILED DESCRIPTION OF THE PREFERRED EMBODIMENT

Figure 7:
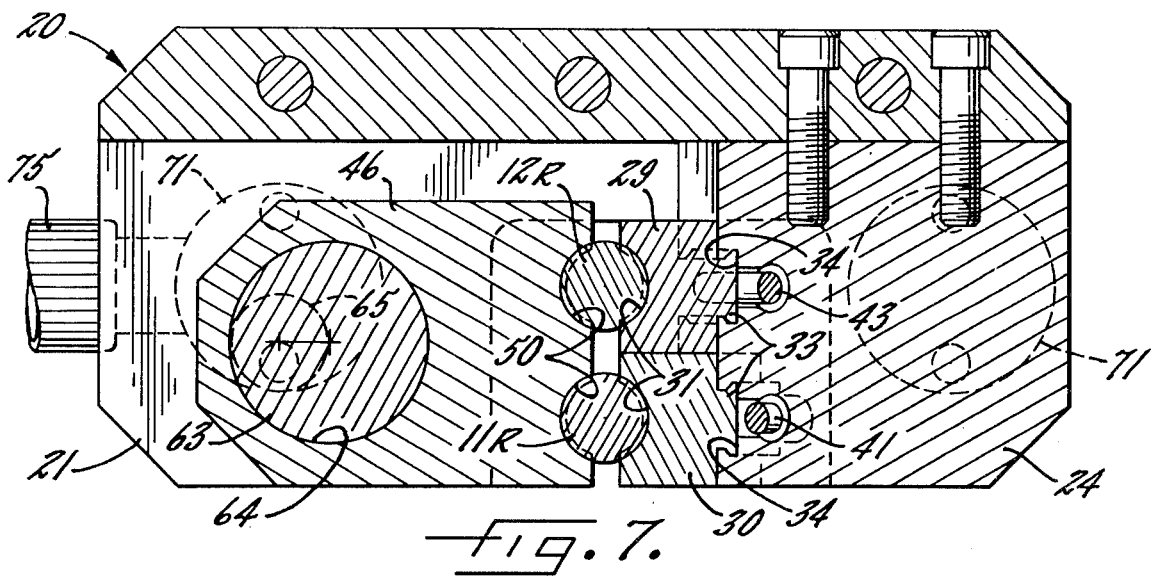
FIGS. 7 and 8 are enlarged cross-sections taken substantially along the lines 7—7 and 8—8, respectively, of FIG. 5.
Figure 8:
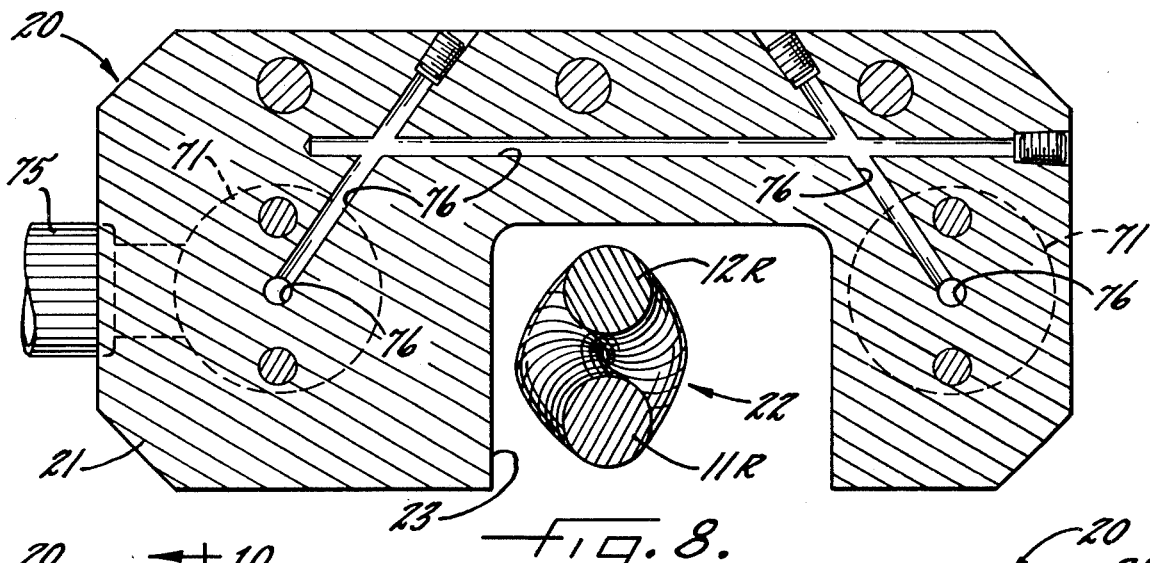

As shown in the drawings for purposes of illustration, the invention is embodied in a device 10 for operating on the two overlapped end sections 11 and 12 of a cable 13 to draw the cable tightly around an article 14 and to place tension in the cable preparatory to the end sections of the cable being fastened together by one or more clamps 15. In the present instance, the two cables shown are of the braided wire type but it should be appreciated that the device 10 may be used to tighten and tension any elongated flexible element and that the term "cable" as used herein is intended to encompass such elements in general. Also, the article 14 has been shown simply as being a large box-like item which is secured to a skid or pallet 16 by two cables. The article could, however, be a massive farm implement or the like which is secured by cables to a flat-bed railroad car, thus requiring considerable tension in the cables to keep the implement rigidly anchored under the high shock loads normally imposed during rail transit.

In general, the tensioning device 10 includes two substantially but not precisely identical end members or heads 19 and 20 (FIG. 2) spaced from one another along the length of the cable 13 and each adapted to receive the two lapped end sections 11 and 12 of the cable. After the cable end sections have been loaded into the heads, the end section 11 (hereinafter called the forward cable end section) is securely clamped to the forward head 19 while the other or rear cable end section 12 is clamped to the rear head 20. Thereafter, the longitudinal spacing between the heads is changed, preferably by spreading the heads apart, thereby to pull the clamped end sections in opposite directions so as to draw the cable tightly around the article 14 and impart tension to the cable. If the desired tension is placed in the cable after the heads have been spread, the clamps 15 may be applied to those parts of the overlapped cable sections between the heads and the latter may be unclamped from the cable. If additional tension is required, the forward head 19 may be unclamped from the forward cable section 11, moved rearwardly toward the rear head 20, re-clamped to the forward cable section, and again stroked forwardly to cause the cable end sections to be further pulled in opposite directions prior to application of the clamps 15. During the time the front head 19 is unclamped from the forward cable end section and is being moved rearwardly, both the forward and the rear cable sections are clamped by the rear head 20 so as to retain the tension imparted to the cable during the previous stroke.

The cable tensioning device 10 of the present invention is generally similar to and possesses virtually all of the advantages of the device disclosed in the aforementioned application. The latter device, however, must be placed between the article and the cable before the cable end sections can be loaded into the device preparatory to being tightened. As a result, it is somewhat difficult to use that device in confined locations and, in addition, the presence of the device between the article and the cable prevents the cable from being drawn into conforming and cinching engagement with that portion of the article located adjacent the device.

In accordance with the invention, the present cable tensioning device 10 is constructed so that it may be loaded simply by being placed over the cable 13 rather than by being placed between the cable and the article 14. By virtue of this construction, the tensioning device occupies only very little space between the cable and the article and thus the cable can be drawn into better conformity with the article.

Before proceeding further with the description of the structural components of the tensioning device 10, it will be helpful to explain that, in carrying out the invention, the two lapped cable end sections 11 and 12 preferably are wrapped around one another before being loaded into the device so that a twist 22 is formed in the cable 13 as shown in FIGS. 2 to 6 and FIG. 8. The end sections 11 and 12 preferably are wrapped through a twist angle of only 180° although they could be wrapped through an angle which is another odd multiple of 180° such as 540° or 900°. As a result of the twist 22, the forward cable section 11 includes a forward free end portion 11F extending forwardly from the twist and further includes a rear portion 11R located rearwardly of the twist. Similarly, the rear cable section 12 includes a rear free end portion 12R extending rearwardly from the twist 22 and further includes a forward portion 12F located forwardly of the twist. The axes of the forward free end portion 11F and the rear free end portion 12R lie substantially along the same straight line and are disposed above the axes of the rear cable portion 11R and the forward cable portion 12F, whose axes are also in line with one another. The purpose of placing the twist 22 in the cable 13 will be explained subsequently.

Now resuming the description of the structural components, each of the heads 19 and 20 includes a substantially U-shaped unit 21 (FIGS. 2 and 8) which defines a downwardly opening cable-receiving opening or throat 23 which accepts both cable end sections 11 and 12 when the tensioning device 10 is loaded. Bolted rigidly to each U-shaped unit and located on the outer side of the throat is a mounting block 24 (FIGS. 5 and 7). The mounting block on the forward head 19 supports an upper gripping and pulling element 25 (FIGS. 5 and 5) for the forward cable free end portion 11F and further supports a lower guide piece 26 (FIGS. 4 and 6) for supporting and guiding part of the cable end portion 12F. Herein, the guide piece 26 is attached rigidly to the adjacent mounting block 24 and is formed with a smooth and substantially semi-cylindrical groove 27 (FIG. 6) for receiving the cable end portion 12F.

The mounting block 24 on the rear head 20 supports an upper gripping and pulling element 29 (FIGS. 4, 5 and 7) for the rear cable free end portion 12R and further supports a lower gripping element 30 (FIGS. 4, 6 and 7) for the cable end portion 11R. Each of the gripping elements 25, 29 and 30 is formed with a substantially semi-cylindrical, cable-receiving groove 31 (FIG. 7) which is suitably serrated to enable the gripping element to bite into and securely clamp the cable 13. In keeping with the invention, the grooves 31 in the gripping elements 25 and 29 are longitudinally in line with one another while the groove 27 in the guide piece 26 and the groove 31 in the gripping element 30 are longitudinally in line with one anther and are located below the grooves in the gripping elements 25 and 29.

Each gripping element 25, 29 and 30 is in the form of a substantially wedge-shaped block having a tongue 33 which is dovetailed into a groove 34 in the inner face of the associated mounting block 24 (see FIG. 7), the tongue-and-groove joints serving to captivate the gripping elements on the mounting blocks while permitting the elements to slide relative to the blocks in a direction extending longitudinally of the cable 13. For a purpose to be explained subsequently, the mounting block 24 on the forward head 19 is formed with an inclined wedge surface 35 (FIG. 5) which opposes and engages the outer wedging face of the gripping element 25 while the mounting block 24 on the rear head 20 is formed with upper and lower inclined wedge surfaces 39 (FIG. 5) and 40 (FIG. 6) disposed in opposing engagement with the outer wedging faces of the gripping elements 29 and 30, respectively. The gripping elements 25 and 30 are both located such that their "fat" ends face forwardly (see FIGS. 4, 5 and 6), and the opposing wedge surfaces 35 and 40 slope outwardly upon progressing forwardly. Thus, a wedging action results and the gripping elements 25 and 30 are pressed inwardly by the wedging surfaces 35 and 40 if the wedging surfaces are either moved forwardly along the gripping elements or if the gripping elements 25 and 30 are moved rearwardly along the wedging surfaces 35 and 40. Conversely, the gripping elements 25 and 30 are released from the wedging action if the wedging surfaces 35 and 40 are either moved rearwardly along the gripping elements of if the gripping elements 25 and 30 are moved forwardly along the wedge surfaces 35 and 40.

The gripping element 29 and the adjacent wedging surface 39 are arranged in a reverse manner. That is to say, the gripping element 29 is positioned with its "fat" end facing rearwardly (see FIGS. 4 and 5) while the wedging surface 39 slopes outwardly upon progressing rearwardly. Accordingly, the gripping element 29 is wedged inwardly if the wedging surface 39 moves rearwardly along the gripping element or if the gripping element moves forwardly along the wedging surface. The wedging action is released when the wedging surface 39 moves forwardly along the gripping element 29 or when the gripping element moves rearwardly along the wedging surface.

Each of the gripping elements 25, 29 and 30 is biased to and normally is disposed in a released position in which the gripping element is located out of wedging engagement with the respective wedging surfaces 35, 39 and 40. For this purpose, a spring loaded plunger 41 (FIG. 5) is carried by the forward mounting block 24 adjacent the wedging surface 35 while two similar plungers (FIGS. 5 and 6) are carried by the rear mounting block 24 adjacent the wedging surfaces 39 and 40. Each plunger bears against a screw 43 extending outwardly from the gripping element and normally presses that screw against an adjustable stop screw 44 threaded into the mounting block. As shown, the gripping elements 25 and 30 are biased forwardly while the gripping element 29 is biased rearwardly.

In order to grip the cable 13, the gripping element 25 coacts with a forward jaw 45 (FIGS. 4 and 5) while the gripping elements 29 and 39 coact with a rear jaw 46

(FIGS. 4 to 7). The two jaws are adapted to be independently moved toward and away from the gripping elements and into and out of clamping engagement with the cable. The inner face of the jaw 45 is formed with a plain lower groove 47 (FIG. 6) adapted to coact with the groove 27 in the guide piece 26 to confine and guide the cable portion 12F and further is formed with a serrated upper groove 49 (FIG. 5) which coacts with the gripping element 25 to clamp the forward free end portion 11F of the cable. Upper and lower serrated grooves 50 (FIGS. 4, 5 and 9) are formed in the inner face of the rear jaw 46 and coact with the gripping elements 29 and 30 to grip the rear cable free end portion 12R and the forward cable portion 11R, respectively.

In keeping with the invention, the jaws 45 and 46 are slidably mounted in the U-shaped units 21 of the heads 19 and 20, respectively, and are adapted to be shifted between released and clamped positions with respect to the gripping elements 25, 29 and 30. To effect such shifting, a cam 63 (FIGS. 3, 5, 7 and 9) is rotatably supported in an opening 64 in each jaw and is rigid with an eccentric shaft 65 whose ends are journaled in the adjacent U-shaped member 21. An operating handle 66 is pivoted at 67 to an extension on each shaft 65 and, by turning the handle about the axis of the shaft, the cam 63 may be rotated through 180 degrees to shift its associated jaw 45, 46 between its clamped position (see FIG. 7) and its released position (see FIG. 9). After the cam has been rotated to cause the jaw to move to its clamped position, the handle 66 may be swung about the pivot 67 and placed in a fork 68 (FIG. 2) on one side of the adjacent U-shaped unit 21, the fork serving as a keeper for the handle and thus serving to hold the cam in its rotated or actuated position.

When the jaws 45 and 46 are in their clamped positions, the grooves 49 and 47 in the forward jaw 45 are disposed in opposing relation with the groove 31 in the gripping element 25 and the groove 27 in the guide piece 26 and thus the cable portions 11F and 12F are confined within such grooves as shown in FIGS. 5 and 6. Also, the grooves 50 in the rear jaw 46 are disposed in opposing relation with the grooves 31 in the gripping elements 29 and 30 so as to confine the cable portions 11R and 12R as shown in FIGS. 5, 6 and 7. The various grooves remain in opposing relation when the jaws 45 and 46 are shifted outwardly to their released positions (see FIG. 9), but the jaws then are spaced laterally from the gripping elements 25, 29 and 30 and the guide piece 26 so that the lower ends of the throats 23 in the U-shaped units 21 are completely open and capable of receiving the cable sections 11 and 12.

The longitudinal spacing between the heads 19 and 20 is changed by a plurality of linear actuators 70 (there herein being two such actuators) which are spaced symmetrically around the cable 13 so that each actuator is equally loaded or stressed when the cable is tensioned. In this instance, the actuators are hydraulically operated and each comprises a cylinder 71 (FIGS. 3 and 5) attached at its rear end to the U-shaped unit 21 of the rear head 20 and slidably receiving a rod 73 whose forward end is attached to the U-shaped unit of the forward head 19. A line 75 communicates directly with the rear end of one of the cylinders 71 and also communicates with the rear end of the other cylinder by means of drilled passages 76 (FIG. 8) formed in the U-shaped unit 21 of the rear head 20 and extending between the cylinders. By actuating a portable hand-operated pumping unit (not shown) connected to the line 75, pressurized oil may be introduced into the cylinders to extend the rods and cause the heads 19 and 20 to spread apart. When the oil is released from the cylinders, springs (not shown) in the forward end portions of the cylinders effect retraction of the rods thereby to draw the forward head toward the rear head.

OPERATION

Now that all of the structural elements of the tensioning device 10 have been described, its use and operation will be explained. Preparatory to using the device, the cable 13 is strung around the article 14 and the skid 16, and the end sections 11 and 12 are wrapped around one another to place the twist 22 in the cable. Prior to being placed on the cable, the device 10 is conditioned with the rods 73 retracted so as to position the head 19 near the head 20. Also, the jaws 45 and 46 are in their released positions so that the lower ends of the throats 23 are completely open and capable of accepting the cable end sections 11 and 12.

With the tensioning device 10 and the cable 13 thus conditioned, the device is placed downwardly over the cable so as, in effect, to cause the cable to enter the throats 23, the twist 22 being located between the heads 19 and 20. The operator then manipulates the cable to place the cable free end portion 11F into the groove 31 of the gripping element 25, the cable portion 11R in the groove 31 of the gripping element 30, the cable portion 12F in the groove 27 of the guide piece 26 and the cable free end portion 12R in the groove 31 of the gripping element 29.

Thereafter, the operator rotates each operating handle 66 to cause the cams 63 to shift the jaws 45 and 46 inward to their clamping positions (FIG. 7). This closes the jaws upon the cable and causes the forward free end portion 11F to become clamped between the forward jaw 45 and the forward gripping element 25 while the cable portion 11R becomes clamped between the rear jaw 46 and the lower rear gripping element 30. The rear cable free end portion 12R becomes clamped between the rear jaw 46 and the upper rear gripping element 29 but the cable portion 12F is not clamped since the groove 27 in the guide piece 26 and the lower groove 47 in the forward jaw 45 are of such radii as to merely confine and not grip the cable portion 12F.

After rotating the handles 66 about the pivots 67 and securing the handles within the forks 68, the operator actuates the pumping unit in order to pressurize the cylinders 71. As a result, the rods 73 extend to shift the forward head 19 forwardly and, at the same time, the rear head 20 is shifted rearwardly. The heads thus are spread apart and the forward cable section 11 is pulled forwardly by the forward gripping element 25 and the jaw 45 while the rear cable section 12 is simultaneously pulled rearwardly by the upper rear gripping element 29 and the jaw 46. During such pulling, unequal side loading is avoided and substantially uniform loading is imposed on the heads 19 and 20, the cylinders 71 and the rods 73 by virtue of the symmetrical angular disposition of the cylinders with respect to the cable 13.

Importantly, the gripping elements 25 and 29 selfenergize and automatically clamp the cable end sections 11 and 12 with a tighter grip as the heads 19 and 20 are spread apart. That is to say, initial forward shifting of the forward head 19 causes the inclined wedge surface 35 (FIG. 5) of the forward mounting block 24 to move forwardly along and wedge against the gripping element 25, the latter initially remaining substantially stationary as a result of being clamped to the forward free end cable portion 11F. Because of such wedging action, the gripping element 25 is forced into even tighter clamping engagement with the forward free end portion 11F so that it is virtually impossible for the gripping element to slip. By the same token, initial rearward shifting of the rear head 20 moves the upper inclined wedge surface 39 (FIG. 5) of the rear mounting block 24 rearwardly relative to the upper rear gripping element 29 and thus wedges that gripping element into even tighter engagement with the rear free end cable portion 12R. It should be noted, however, that the lower rear gripping element 30 does not grip and retard forward movement of the cable portion 11R during rearward movement of the head 20 but instead merely slides rearwardly along that cable portion. In other words, initial rearward movement of the rear head 20 causes the inclined wedge surface 40 (FIG. 6) to move rearwardly along and out of wedging engagement with the gripping element 30 and thus the associated spring-loaded plunger 41 forces the gripping element forwardly to its released position to free the cable end portion 11R from the clamping force previously imposed by the gripping element and the opposing groove in the rear jaw 46.

The operator pressurizes the cylinders 71 to spread the heads 19 and 20 until a preselected amount of tension has been placed in the cable 13, the operator being able to determine the amount of tension by means of a pressure gage (not shown) connected in the line 75. If the desired amount of tension can be placed in the cable before the rods 73 reach the end of their stroke—each rod herein having a stroke of 5½ inches—the operator, while keeping the cylinders pressurized, anchors two or more clamps 15 to the end sections 11 and 12 of the cable at a position or positions located between the two heads and on opposite sides of the twist 22. The clamps bind the two end sections of the cable together and thus maintain the tension imparted to the cable by the tensioning device 10. It is important to note that those parts of the cable directly adjacent the clamps are actually in tension prior to application of the clamps. Thus, if four clamps 15 are used, all parts of the lapped cable end sections 11 and 12 located between the two outboard clamps remain in tension after the clamps have been secured to and the tensioning device 10 has been released from the cable. Upon release of the tensioning device, tension is lost only in that part of the forward cable free end portion 11F located forwardly of the forward clamp and that part of the rear cable free end portion 12R located rearwardly of the rear clamp.

Figures 9, 10:
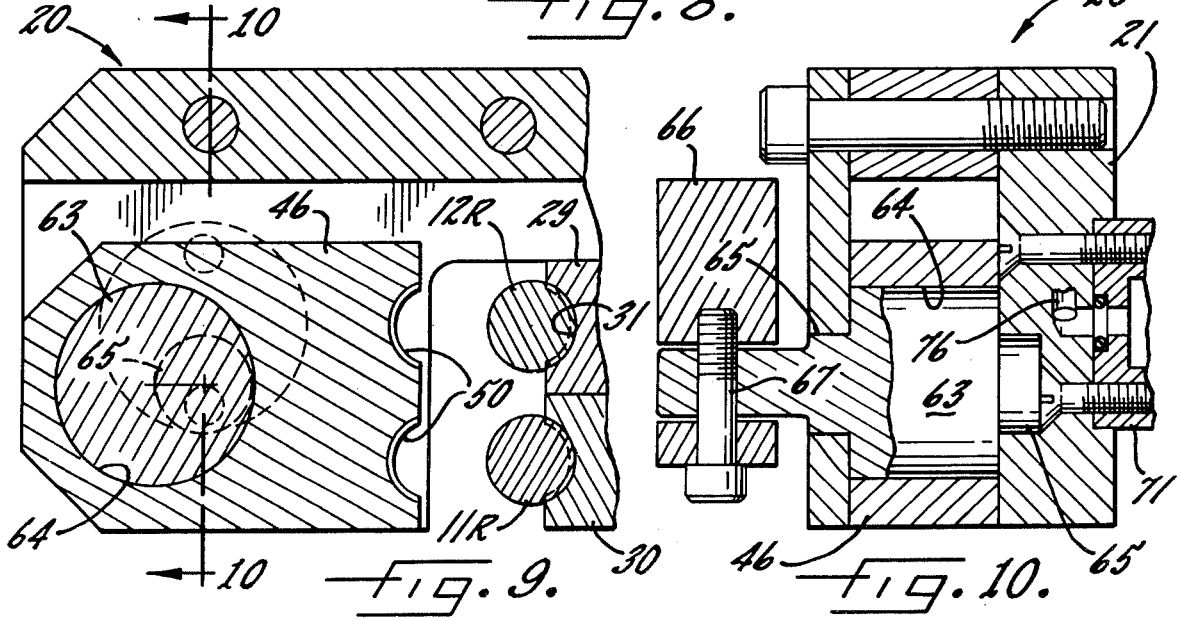
FIG. 9 is a fragmentary view similar to FIG. 7 but shows certain parts of the device in moved positions.
FIG. 10 is a fragmentary cross-section taken substantially along the line 10—10 of FIG. 9.

After securing the clamps 15 to the cable 13, the operator may rotate the cams 63 to move the jaws 45 and 46 to their open or released positions shown in FIG. 9. Thereafter, the pressure in the cylinders 71 is released and the spring-loaded plungers 41 automatically force the gripping elements 25 and 29 to their released positions so that the elements release the cable. The tensioning device then may be removed from the cable simply by lifting the device off of the cable.

In some instances, sufficient tension may not be imparted to the cable 13 after the rods 73 have moved through their maximum 5½ inch stroke. If this should be the case, the tensioning device 10 can be cycled through another tensioning stroke without need of applying the clamps 15 to maintain the tension previously placed in the cable.

More specifically, progressive cycling of the tensioning device 10 through one or more additional strokes is achieved by the operator releasing the forward jaw 45 while leaving the rear jaw 46 closed. When the forward jaw is opened, the upper forward gripping element 25 is effectively released from the forward cable free end portion 11F. The cable portion 11R then, however, is automatically gripped by the lower rear gripping element 30 and very little tension is lost from the cable. That is to say, release of the upper forward gripping element 25 from the forward cable free end portion 11F causes the tension placed in the forward cable section 11 to exert a rearwardly directed force on the lower rear gripping element 30. Such force tends to move the lower rear gripping element 30 in a rearward direction along the inclined wedging surface 40 (FIG. 6) of the rear mounting block 24 and thus that gripping element is wedged into clamping engagement with the cable portion 11R to keep the latter from moving rearwardly and losing its tension. The tension placed in the rear cable free end portion 12R exerts a force tending to move the upper gripping element 29 forwardly along the adjacent wedge surface 39 (FIG. 5) and thus the gripping element 29 keeps the cable portion 12R clamped within the rear head 20 to maintain the tension.

With both cable sections 11 and 12 being clamped in the rear head 20, the latter is held in a stationary position along the cable 13. Accordingly, the operator may de-pressurize the cylinders 71 to move the forward head toward the rear head, may close the forward jaw 45 to re-clamp the forward cable free end portion 11F with the gripping element 25, and then may re-pressurize the cylinders to shift the forward head 19 forwardly and impart additional tension to the cable in the same manner as during the previous stroke. Thus, the device 10 may be operated through successive strokes without need of applying the clamps 15 to the cable between strokes.

The purpose of forming the twist 22 in the cable 13 is to place the cable free end portion 11F in line with the cable free end portion 12R and also to bring the cable portions 11R and 12F in line with one another and thereby prevent the tensioned cable from turning the device 10 end-for-end in a vertical plane as viewed in FIG. 2. If the cable end sections 11 and 12 were merely lapped over one another and not twisted, the cable sections, upon being tensioned, tend to spring into longitudinal alinement with one another and would attempt to turn the device 20 end-for-end in such vertical plane, thereby possibly throwing the device from the cable and possibly causing damage to the device or injury to the operator. The twist eliminates the danger of such end-for-end turning and makes it possible to provide a tensioning device which may have open throats 23 and which does not require elements for closing up the throats after the cable has been loaded.

From the foregoing, it will be apparent that the present invention brings to the art a new and improved cable tensioning device 10 which possesses virtually every advantage of the device disclosed in my copending application and which is capable of being loaded simply by being placed over the cable 13, such loading being made possible by virtue of the downwardly opening throats 23. Thus, the present device 10 may be loaded from its lower side and may be referred to as a bottom loading device whereas the device disclosed in my copending application is of the top loading type. As pointed out previously, the present device allows the cable 13 to be tightened into better conforming engagement with the article 14 since only a very small part of the device occupies any space between the cable and the article.

I claim:

1. A device for tensioning a cable having lapped end sections wrapped around another through an angle which is an odd multiple of 180° whereby a twist is formed in said cable, said first and second end sections having first and second free end portions, respectively, extending in opposite directions from said twist with the axes of the two free end portions being located substantially along the same straight line, said device comprising first and second members spaced from one another along said cable, linear actuating means connected between said members, said actuating means being operable when actuated in one direction to spread said members apart and being operable when actuated in the opposite direction to draw said members toward one another, said first and second members having first and second cable-receiving throats, respectively, each adapted to accept said first and second cable end sections, first and second gripping elements within the respective throats and each having a longitudinally extending groove for receiving the respective cable free end portion, the groove in said first gripping element being longitudinally in line with the groove in said second gripping element, first and second jaws disposed in opposing relation with said first and second gripping elements, respectively, said first and second jaws having first and second longitudinally extending grooves, respectively, disposed in opposing relation with the grooves of the respective gripping elements, the groove in said first jaw being longitudinally alined with the groove in said second jaw, means on said members for moving said jaws toward and away from said gripping elements between clamped and released positions, said jaws and said gripping elements clamping the respective cable free end portions in the respective grooves when said jaws are in said clamped positions and releasing the cable free end portions when said jaws are in said released positions, said gripping elements and said jaws being attached to and movable in unison with the respective members as the latter are spread apart and drawn toward one another and being operable to pull the clamped first and second cable free end portions in opposite directions along said line as said members are spread apart whereby tension is placed in said cable.

2. A device as defined in claim 1 further including a third gripping element within said first throat and operable to grip said second cable free end portion when said members are drawn toward one another, said third gripping element having a longitudinally extending cable-receiving groove which is longitudinally out of line with the grooves in the other two gripping elements.

* * * * *